United States Patent
Boston et al.

(10) Patent No.: US 11,541,720 B2
(45) Date of Patent: Jan. 3, 2023

(54) AUTONOMOUS VEHICLE CLIMATE OPTIMIZATION

(71) Applicant: Ford Global Technologies, LLC, Dearborn, MI (US)

(72) Inventors: Daniel Boston, Dearborn, MI (US); Nayaz Khalid Ahmed, Dearborn, MI (US); Ali Soloukmofrad, Dearborn, MI (US); Jimmy Kapadia, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 16/770,727

(22) PCT Filed: Dec. 12, 2017

(86) PCT No.: PCT/US2017/065900
§ 371 (c)(1),
(2) Date: Jun. 8, 2020

(87) PCT Pub. No.: WO2019/117878
PCT Pub. Date: Jun. 20, 2019

(65) Prior Publication Data
US 2020/0307352 A1    Oct. 1, 2020

(51) Int. Cl.
*G06Q 30/02* (2012.01)
*B60H 1/00* (2006.01)
*G06Q 50/30* (2012.01)

(52) U.S. Cl.
CPC ......... *B60H 1/00807* (2013.01); *G06Q 50/30* (2013.01); *B60H 1/00742* (2013.01)

(58) Field of Classification Search
CPC ............................ G06Q 50/30; B60H 1/00742
See application file for complete search history.

(56) References Cited

U.S. PATENT DOCUMENTS 5,395,042 A * 3/1995 Riley ................. G05D 23/1917
236/47
5,570,838 A * 11/1996 Davis, Jr. ........... B60H 1/00785
454/258

(Continued)

FOREIGN PATENT DOCUMENTS

WO    2017/079222 A1    5/2017
WO    2017/172415 A1    10/2017

OTHER PUBLICATIONS

"Envisioning the Car of the Future as a Living Room on Wheels" (Taub, Eric, Jun. 15, 2017 published at https://www.nytimes.com/2017/06/15/automobiles/) (Year: 2017).*

(Continued)

*Primary Examiner* — James M Detweiler
(74) *Attorney, Agent, or Firm* — Brandon Hicks; Eversheds Sutherland (US) LLP

(57) ABSTRACT

A method for optimizing climate control in an autonomous vehicle. The method includes receiving a ride request for an autonomous vehicle from a customer. A desired temperature for an interior of the autonomous vehicle may be determined based on the ride request. The current temperature of the vehicle interior may then be adjusted such that the current temperature substantially matches the desired temperature when the autonomous vehicle reaches the customer. The temperature of the vehicle interior may be allowed to deviate from the desired temperature, within a pre-determined temperature deviation range, when the autonomous vehicle is unoccupied. A corresponding system and computer program product are also disclosed and claimed herein.

20 Claims, 7 Drawing Sheets

(56) References Cited

U.S. PATENT DOCUMENTS

| | | | |
|---|---|---|---|
| 9,682,609 B1 | 6/2017 | Dudar | |
| 2013/0079978 A1* | 3/2013 | Uyeki | B60H 1/00771 |
| | | | 701/36 |
| 2014/0277762 A1* | 9/2014 | Drew | F24F 11/30 |
| | | | 700/276 |
| 2015/0129192 A1 | 5/2015 | Boss et al. | |
| 2016/0207374 A1* | 7/2016 | Gauthier | B60H 1/00742 |
| 2017/0126810 A1 | 5/2017 | Kentley et al. | |
| 2017/0132934 A1 | 5/2017 | Kentley et al. | |
| 2017/0227371 A1* | 8/2017 | O'Mahony | G08G 1/096811 |
| 2017/0282821 A1* | 10/2017 | Zych | G06Q 50/30 |
| 2018/0056903 A1* | 3/2018 | Mullett | B60R 16/037 |
| 2019/0118616 A1* | 4/2019 | Morita | G06Q 50/30 |

OTHER PUBLICATIONS

"Envisioning the Car of the Future as a Living Room on Wheels" (Taub, Eric, Jun. 15, 2017 published at https://www.nytimes.com/2017/06/15/automobiles/wheels/driverless-cars-interior.html) (Year: 2017).*

International Search Report of the International Searching Authority for PCT/US2017/065900 dated Feb. 14, 2018.

* cited by examiner

AUTONOMOUS VEHICLE CLIMATE OPTIMIZATION

BACKGROUND

Field of the Invention

This invention relates to climate control systems for autonomous vehicles.

Background of the Invention

Automatic climate control is the technology that enables monitoring and adjusting the temperature of a confined space to a desired level without manual intervention. Modern vehicles incorporate automatic climate control as a standard feature to maintain a comfortable climate for vehicle passengers.

Heating Ventilation and Air Conditioning ("HVAC") systems are complex system of mechanical and/or electrical switches or knobs on the front-end, and motors, actuators, and a refrigeration unit on the back-end. Air flows through the system via ducts, which may be opened to allow heated or cooled air into the vehicle cabin. The basic principle behind the operation of a HVAC unit is conduction and convection. Heat is transferred from a low-temperature region to a high-temperature region in the vehicle due to pressure differences—otherwise known as the refrigeration process.

Although still under development, autonomous (e.g., driverless) vehicles may be used for ride-sharing services. In some cases, such vehicles may need to travel for periods of time without passengers, such as between booked rides or while transporting cargo. During these time periods, such vehicles may not need to be climate-controlled. They should, however, remain relatively climate-ready in the event a ride is hailed nearby.

Maintaining the cabin of a vehicle at a comfortable temperature throughout the day may be excessively energy and cost intensive. If the temperature of the cabin is far outside a comfortable range when a ride is booked, however, the time it takes to prepare the cabin climate may substantially delay a pick up time for the passenger and may decrease the passenger's satisfaction with the trip if the cabin temperature is uncomfortable during the ride.

In view of the foregoing, what are needed are systems and methods to ensure an autonomous vehicle cabin is maintained at a comfortable temperature for passengers while minimizing the amount of energy consumed during times when the vehicle is unoccupied. Ideally, such systems and methods would be cost efficient and would automatically tailor temperature and climate control settings to particular users.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
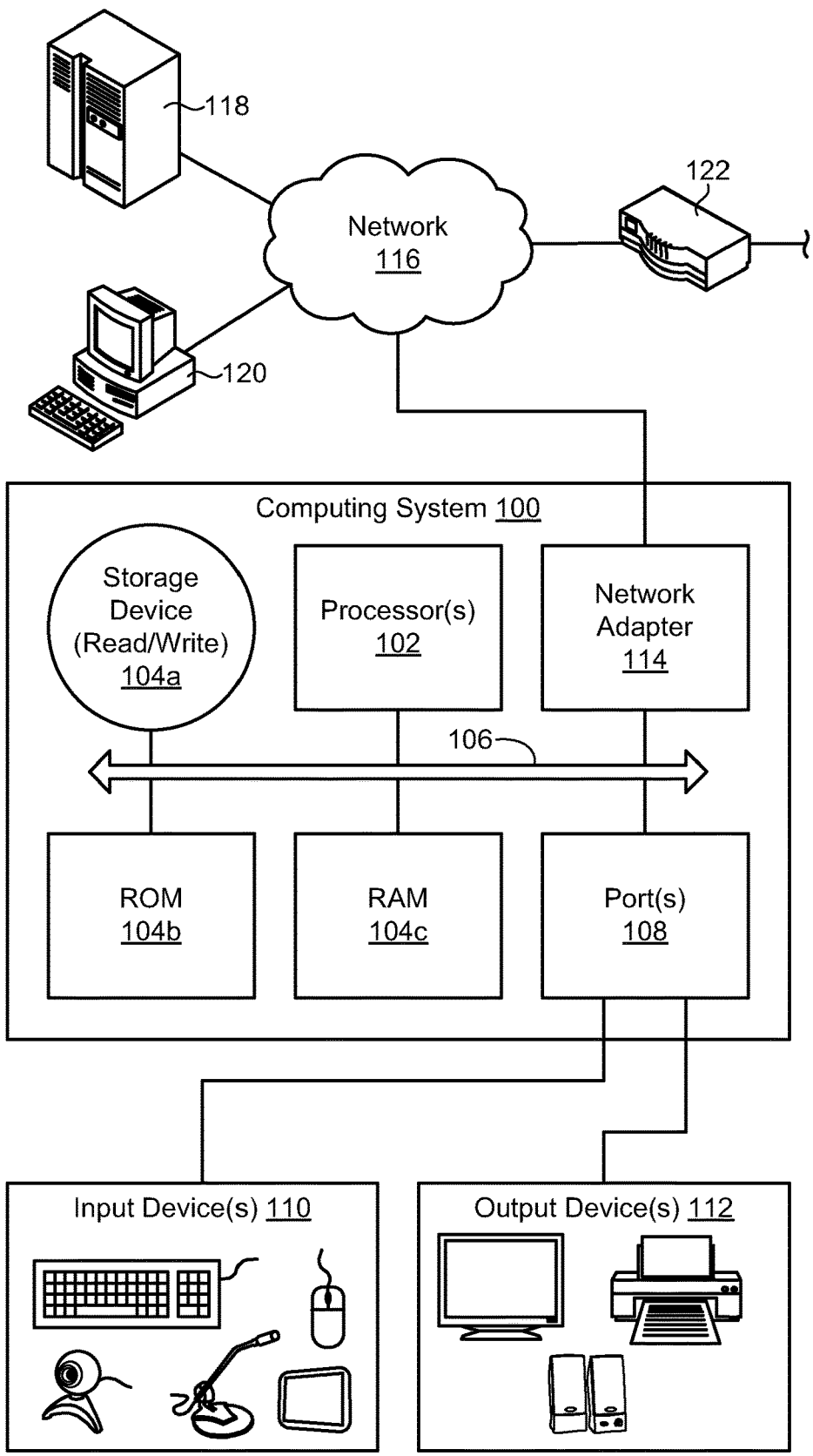
FIG. 1 is a high-level block diagram showing one example of a computing system in which a system and method in accordance with the invention may be implemented.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Though currently under development, autonomous vehicles 204 may provide users with an easy-to-use, readily-available alternative to traditional ride-sharing or taxi services. Users may also prefer autonomous vehicle 204 ride-sharing or taxi services as a more private, customizable experience than traditional transportation services. In one aspect, for example, the interior temperature of an autonomous vehicle 204 may be set and maintained in accordance with a user's actual or predicted personal preferences.

Autonomous vehicles 204 implemented for ride-sharing or taxi purposes, however, may be unoccupied for periods of time, such as between booked rides or while transporting cargo. Since interior climate control is an energy-intensive process, it may be desirable to deactivate the climate control system and thus conserve energy and reduce costs during such times.

Figure 2:
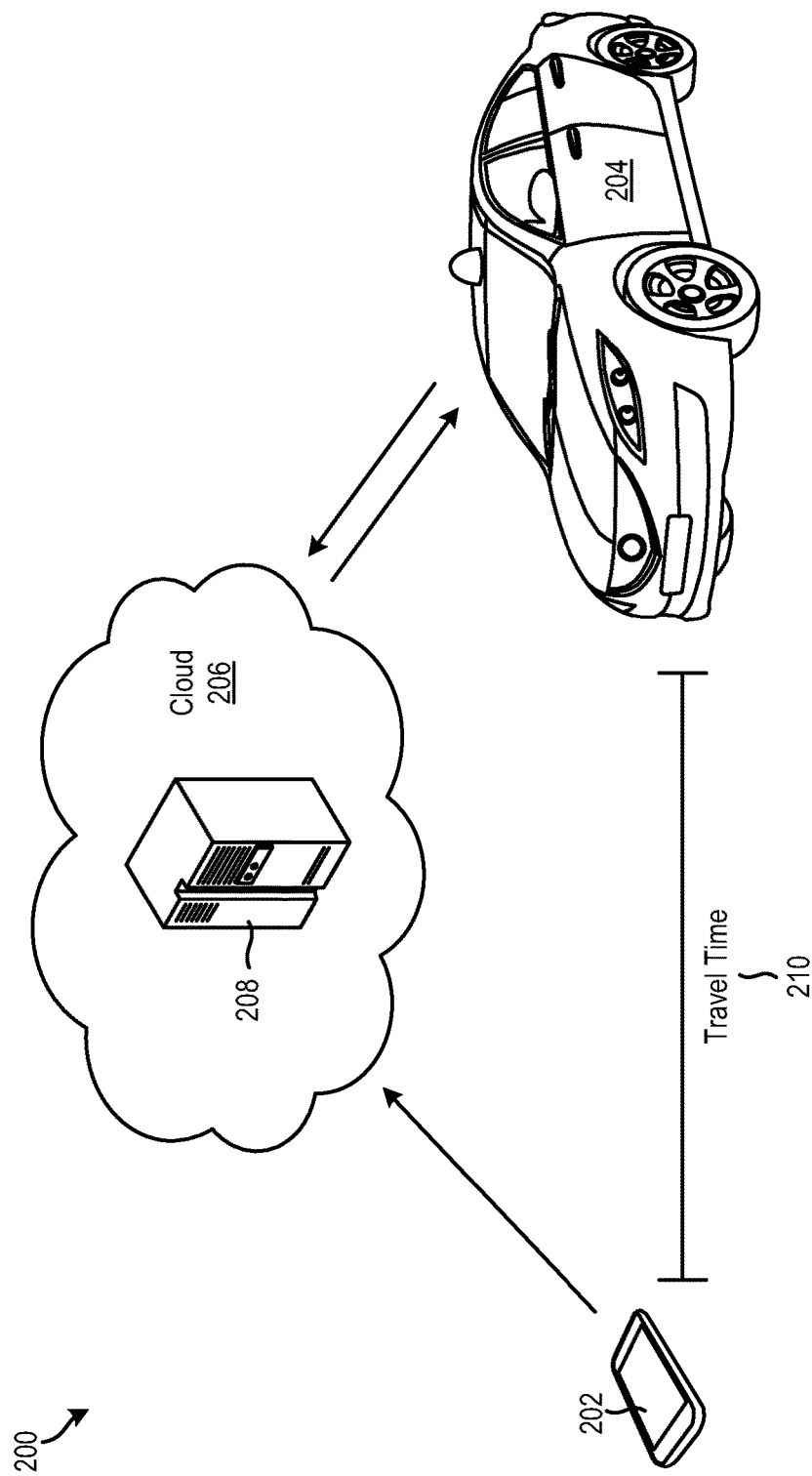
FIG. 2 is a high level schematic showing components of a system for optimizing climate control in an autonomous vehicle in accordance with certain embodiments of the invention.

Referring now to FIG. 2, a system 200 for optimizing climate control in accordance with the invention may include an autonomous vehicle 204 that provides transportation services, such as ride-sharing and/or taxi services, for users. In certain embodiments, users may summon an autonomous vehicle 204 by way of an application on a computing device 202, such as a cell phone, tablet, laptop computer, desktop computer, or the like. The computing device 202 may communicate with the cloud 206 over any suitable network such as a cellular network, WiFi, or the like. The cloud 206 may in turn communicate with the autonomous vehicle 204 over a cellular network, WiFi, or the like.

In certain embodiments, a remote server such as a cloud server 208 may find a suitable autonomous vehicle 204 in the vicinity of the user, and may instruct the autonomous vehicle 204 to travel to the location of the user. In some embodiments, the cloud server 208 may calculate a travel time 210 between available autonomous vehicles 204 and the location of the user. The cloud server 208 may then select a particular autonomous vehicle 204 to pick up the user based on a shortest associated travel time 210.

In certain embodiments, the autonomous vehicle 204 may be unoccupied as it travels to the location of the user or to another location, such as a location of origin. In other embodiments, the autonomous vehicle 204 may be unoccupied while providing cargo transportation services or the like. As discussed in more detail below, during these time periods, it may be desirable to adjust the temperature and/or climate of the autonomous vehicle 204 as needed to increase efficiency or conserve energy.

For example, in cold weather, the heating system of the autonomous vehicle 204 may be deactivated and the interior temperature of the autonomous vehicle 204 allowed to drop. In warm weather, the cooling system of the autonomous vehicle 204 may be deactivated to allow the internal temperature of the autonomous vehicle 204 to rise. Such adjustments may be made according to algorithmic calculations performed by a processor located on-board the autonomous vehicle 204. In alternative embodiments, algorithmic calculations may be made in the cloud server 208 and delivered to the autonomous vehicle 204.

As will also be appreciated, a user may have certain preferences as to the inside temperature and/or climate of the autonomous vehicle 204. As used herein, the terms "temperature" and "climate" may be used interchangeably and may include, for example, temperature, humidity level, seat heating, seat cooling, air freshening, and the like. In some embodiments, preferences associated with a user may be maintained by the computing device 202 and accessed by the cloud server 208 upon receiving a request for an autonomous vehicle 204 from the user. Alternatively, preferences associated with the user may be maintained by the cloud server 208 or other remote server. In some embodiments, as discussed in more detail below, preferences associated with the user may be automatically updated by way of computer learning techniques implemented by embodiments of the invention.

Figure 3:
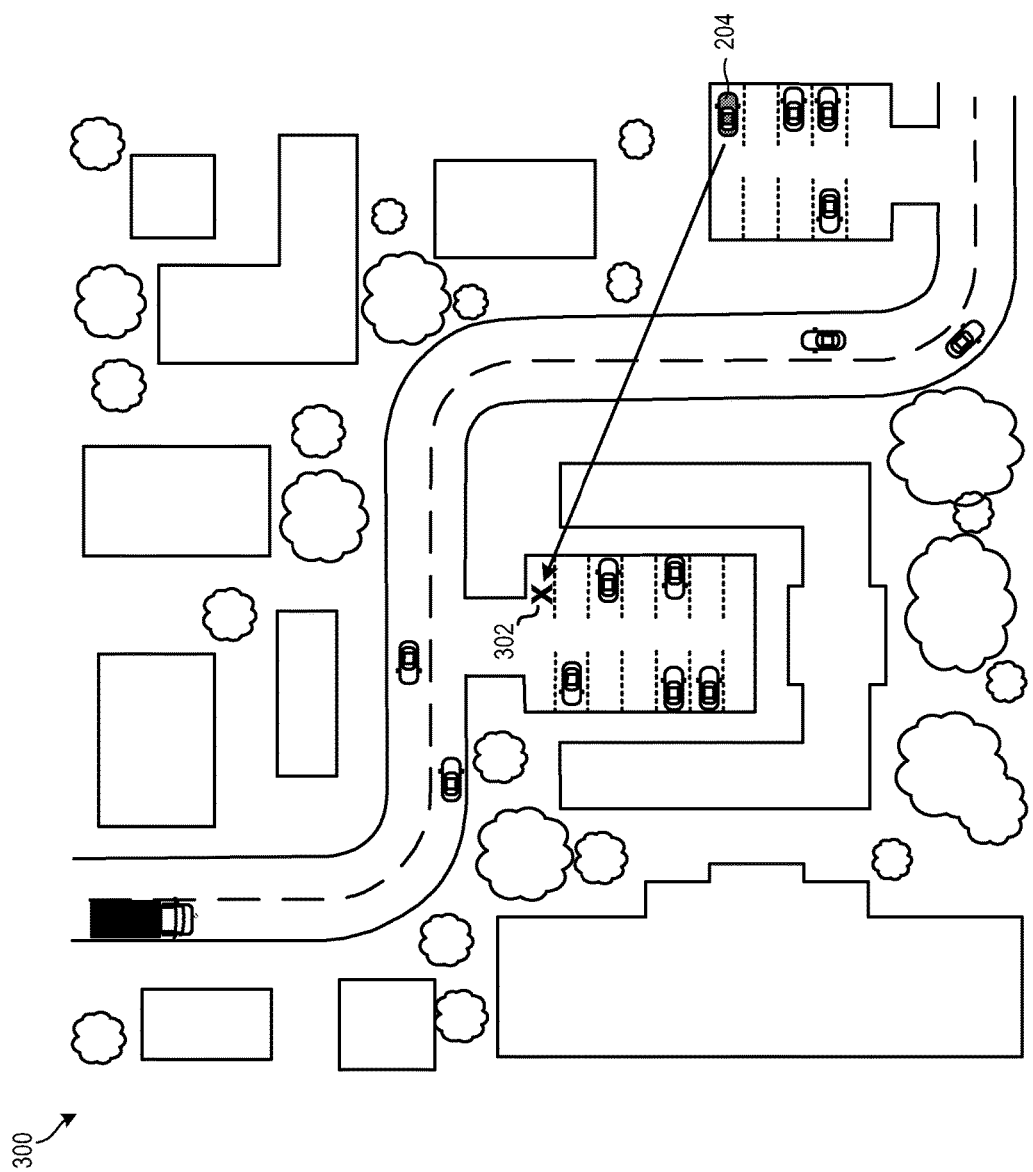
FIG. 3 is a map depicting various factors in determining a temperature deviation range in accordance with one embodiment of the invention.

FIG. 3 is a map 300 showing an autonomous vehicle 204 available to provide a ride-sharing or taxi service in accordance with embodiments of the invention. A user may utilize an application installed on a mobile device, for example, to summon a ride from the autonomous vehicle 204. The user may specify a desired pickup location 302, or the pickup location 302 may be automatically determined based on a present location of the user.

For example, in one embodiment, the mobile device may include a global positioning system that may communicate the user's present location to the cloud server 208. The cloud server 208 may utilize this information to locate available autonomous vehicles 204 in the area. One autonomous vehicle 204 may be assigned to pick up the user based on the ride request. In some embodiments, the closest available autonomous vehicle 204 may be identified and assigned to the user based on an estimated travel time between a current location of the autonomous vehicle 204 and the pickup location 302, a distance between the autonomous vehicle 204 and the pickup location 302, or the like. In other embodiments, other factors may be taken into account to assign an autonomous vehicle 204 to a user. Such factors may include, for example, make and model of the autonomous vehicle 204, energy costs associated with conditioning the autonomous vehicle 204 for use, and attributes of the autonomous vehicle 204 such as passenger and/or luggage carrying capabilities.

Upon assigning an autonomous vehicle 204 to fulfill a particular ride request, an inside temperature of the autonomous vehicle 204 may be adjusted to conform to a user's actual or expected preferences. In some embodiments, the inside or interior temperature associated with the selected autonomous vehicle 204 may vary depending on, for example, an outside temperature or previous temperature settings. To determine a desired or set temperature, embodiments of the invention may consider various factors. In one embodiment, for example, the user may directly input a desired temperature setting in connection with the ride request. Alternatively, an expected preferred temperature may be derived from historical and/or live data. In one embodiment, the set temperature may default to a zone of human comfort set forth in a standard psychrometric chart.

In one embodiment, the set temperature may be determined by an algorithm based on previous desired temperatures of users requesting rides under similar circumstances. This algorithm may take into account the requested pickup location 302, geographic location, outside temperature, weather conditions, time of year, date, and the like. The algorithm may analyze current information and build an estimated set temperature based on historical information associated with these parameters. If the weather is rainy but the date is in June, for example, the temperature may be set lower than if the weather is rainy in November. Each of the parameters applicable to current conditions may be weighted, and such weights may be adjusted over time to reflect newer calculations.

In certain embodiments, the algorithm may also take into account historical data specific to the user. For example, preferences previously associated with a user may be stored in a user profile, which may be accessed by embodiments of the invention. In some embodiments, attributes of the user may also be recorded in the user profile. User attributes may include, for example, age, gender, height, weight, ethnicity, and the like. Such attributes may be used to adjust weights assigned to various parameters for determining an appropriate inside temperature for an autonomous vehicle 204.

Elderly riders, for example, may be more likely than the general population to be dissatisfied with a ride that is too cold. A numerical value or weight associated with age may be adjusted to ensure that the interior temperature of a selected autonomous vehicle 204 is set higher with increased age.

In certain embodiments, live information may override historical parameter weights in determining the set temperature of the autonomous vehicle 204. In the event a user declares a desired temperature, for example, that temperature may be established as the set temperature notwithstanding historical or other factors to the contrary. In other embodiments, special circumstances associated with the pickup location 302, such as the presence of an outdoor festival or water park, may override historical or other factors in determining an appropriate set temperature for the autonomous vehicle 204. Indeed, if the pickup location 302 coincides with an outdoor festival, it is likely that a user may have spent a considerable amount of time outdoors and would appreciate a reduced temperature inside the autonomous vehicle 204 to cool down.

Users may, of course, manually adjust the set temperature of the autonomous vehicle 204 at any time during the ride. Manual adjustments made by a user may be recorded and stored in connection with the user profile. A learning algorithm may be used to incorporate these adjustments into the user profile and update associated parameters accordingly. In this manner, embodiments of the invention may optimize user satisfaction over time.

Figure 4:
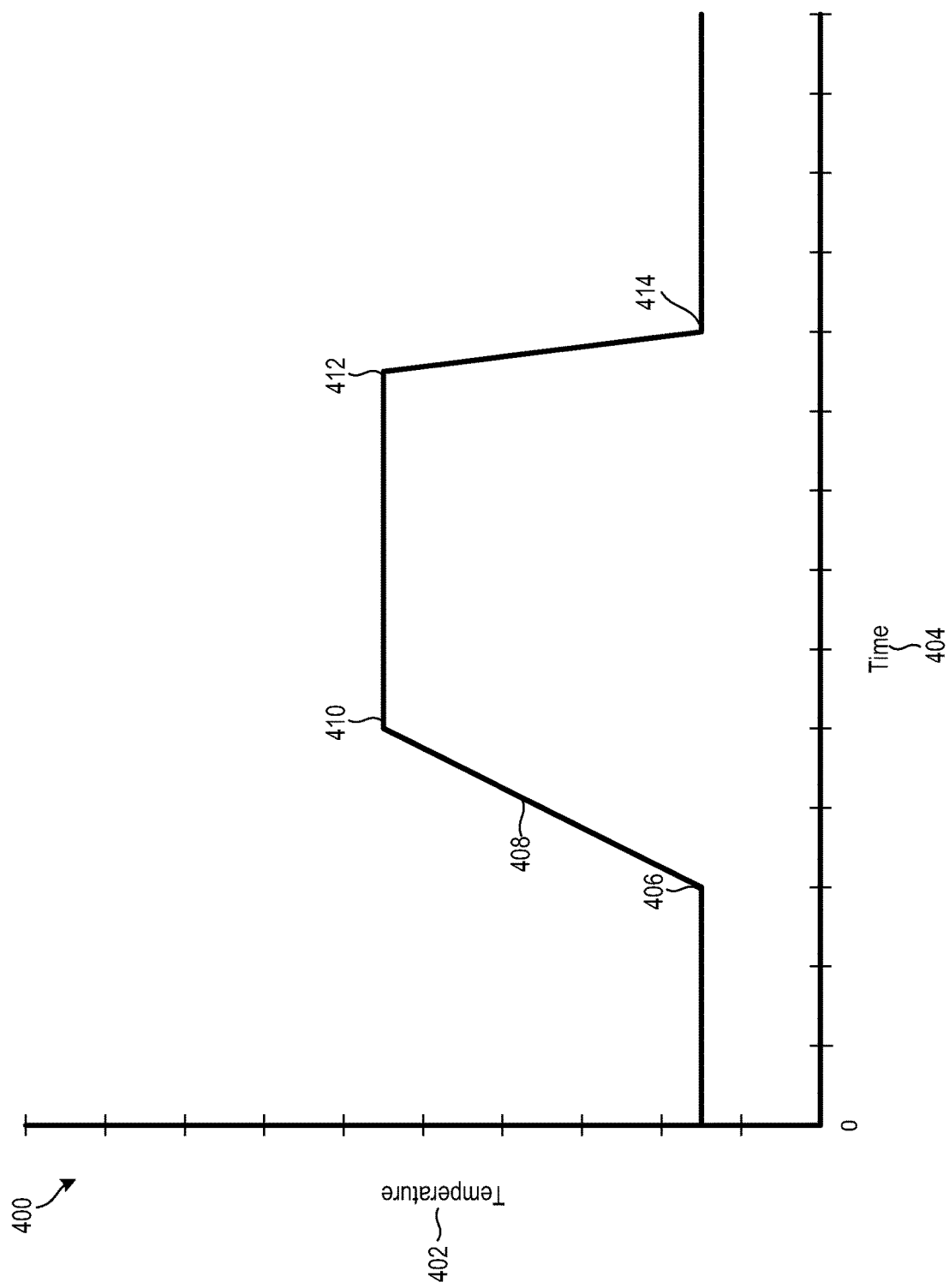
FIG. 4 is a graph showing an interior temperature of an autonomous vehicle over time in accordance with certain embodiments of the invention.

Referring now to FIG. 4, embodiments of the invention may reduce energy expenditures associated with temperature or climate control by allowing the inside temperature of the autonomous vehicle 204 to deviate from the set temperature when the autonomous vehicle 204 is unoccupied.

The graph 400 of FIG. 4, for example, shows an interior temperature 402 of an autonomous vehicle 204 relative to time 404. Prior to receiving and accepting a ride request 406, the interior temperature 402 may be unregulated and allowed to vary with an outside temperature. Upon accepting the ride request 406, the interior temperature of the autonomous vehicle 204 may be adjusted 408 to warm or cool the autonomous vehicle 204 as needed to meet the set temperature 410. Preferably, this adjustment 408 may be instigated immediately upon receiving the ride request 406 to enable the interior temperature to reach the set temperature 410 by the time the autonomous vehicle 204 reaches the pickup location.

The set temperature 410 may be maintained substantially constant throughout the duration of the ride, from the time the autonomous vehicle 204 reaches the pickup location until the time the user exits 412 the autonomous vehicle 204. In certain embodiments, adjustments to the set temperature 410 may be made manually, and the adjusted temperature maintained for the duration of the ride. In other embodiments, adjustments to the set temperature 410 may be made throughout the duration of the ride. Multiple adjustments may be needed, for example, to accommodate the preferences of additional riders picked up by the same autonomous vehicle 204.

When the user or last occupant exits 412 the autonomous vehicle 204, the temperature 402 may be allowed to deviate from the set temperature 410 to avoid energy costs associated with maintaining the interior of the autonomous vehicle 204 at a temperature higher or lower than an outside temperature. The rate of change from the set temperature 410 to a resting temperature 414 may depend on a difference between interior and exterior temperatures when the user exits the autonomous vehicle 204.

Figure 5:
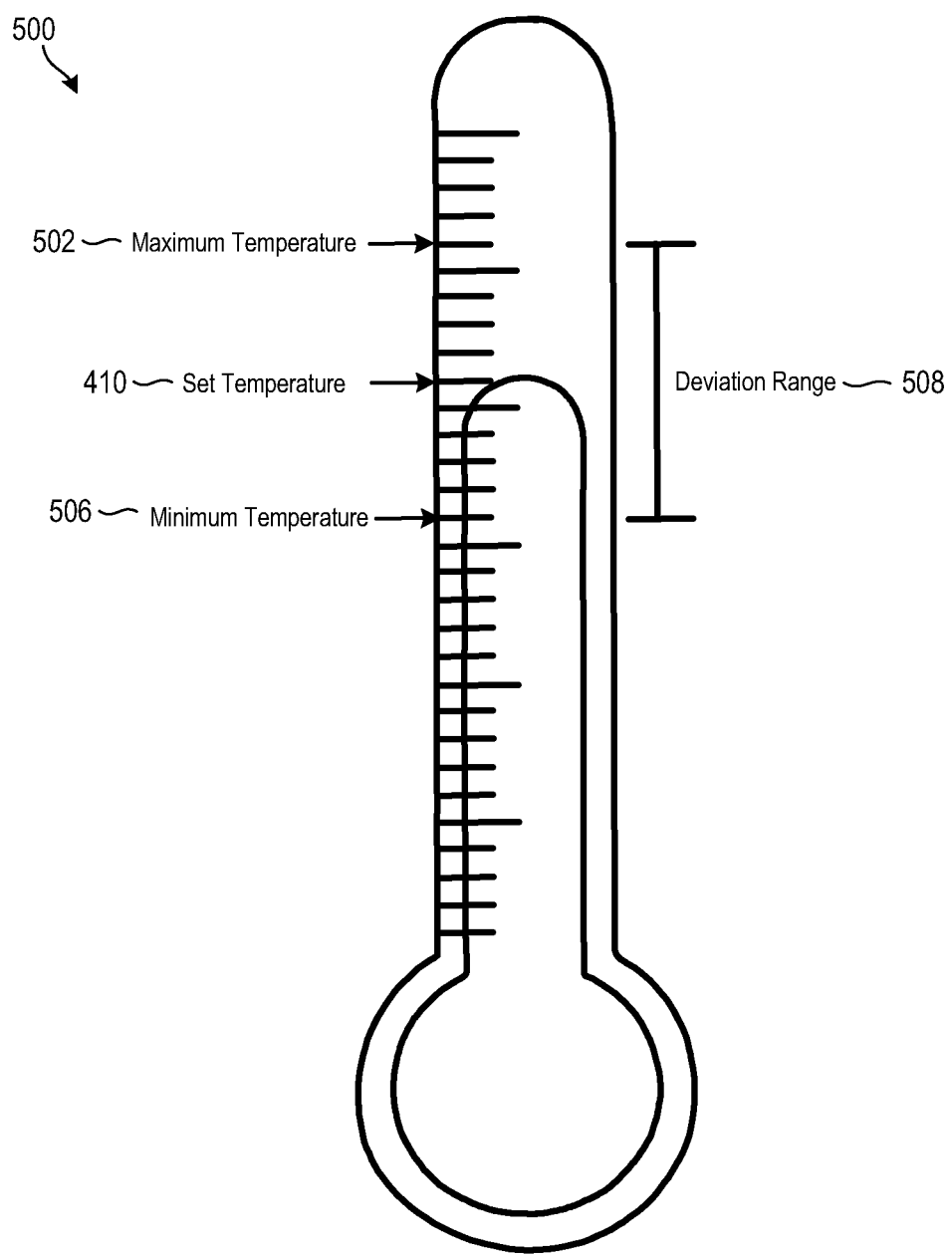
FIG. 5 is a front view of a thermometer depicting a set temperature and temperature deviation range of an interior of an autonomous vehicle in accordance with one embodiment of the invention.

Referring now to FIG. 5, in some embodiments, an interior temperature 500 of an autonomous vehicle 204 may be regulated to optimize fuel consumption while minimizing a risk that the interior temperature 500 will be outside of a comfortable range when the autonomous vehicle 204 arrives at a next pickup location. To this end, some embodiments of the invention may determine a deviation range 508 within which the interior temperature 500 may be maintained when the autonomous vehicle 204 is unoccupied. A minimum temperature 506 and a maximum temperature 502 may be determined based on various parameters, and may define a deviation range 508 therebetween.

The deviation range 508 may be determined with an aim to balance two objectives: (1) minimizing the risk of reaching a user before an interior temperature 500 has reached the set temperature 410; and (2) minimizing fuel consumption while the autonomous vehicle 204 is unoccupied. To this end, as discussed in more detail below, embodiments of the invention may calculate the likelihood of receiving a ride request within a certain distance or travel time. Embodiments of the invention may further calculate the energy consumption associated with specific deviation ranges 508. Certain embodiments may evaluate the condition of other autonomous vehicles 204 in the vicinity to determine if it would be more efficient for a more well-conditioned vehicle 204 to accept the ride request, even if that vehicle 204 is located farther away.

To both determine a probability that the autonomous vehicle 204 will receive a ride request and to predict its expected location, embodiments of the invention may use various historical and live parameters. Historical parameters may include, for example, time of day, day of the week, date, distance from pickup points of interest, weather conditions, outside temperature, parking availability, geographic location, regularly occurring events, and the like. These parameters may be used to determine the likely demand, or likelihood that a user will request a ride. In some embodiments, these parameters may be evaluated with reference to a historical profile to determine a likelihood of received a ride request from a location.

Supply parameters may be used to calculate a risk that a particular autonomous vehicle 204 will be assigned to the ride request 406. These parameters may include, for example, primary assignment of the autonomous vehicle 204, number of other autonomous vehicles 204 available for ride-sharing and their primary assignment, proximity of other available autonomous vehicles 204 to the pickup location, temperature conditions of the other available autonomous vehicles 204, and vehicle attributes of other available autonomous vehicles 204.

Primary assignment of the autonomous vehicle 204 refers to whether the autonomous vehicle 204 is primarily designated to carry cargo or passengers. An autonomous vehicle 204 primarily assigned to carry cargo may be required to pick up a user only in the event it is the only autonomous vehicle 204 available within an acceptable distance. Such an autonomous vehicle 204 may not be required to answer ride requests 406, however, and therefore would be able to accommodate a much larger temperature deviation range 508 than autonomous vehicles 204 designated primarily for passengers. On the other hand, an autonomous vehicle 204 primarily assigned to carry passengers but in close proximity to multiple autonomous vehicles 204 assigned to carry cargo would nevertheless be very likely to be assigned a ride request 406.

In some embodiments, if an autonomous vehicle 204 primarily designated for passengers is in close proximity to other similarly-designated autonomous vehicles 204, such vehicles 204 may communicate their current conditions to a remote server or cloud server 208. An associated processor may then determine which of the vehicles 204 is most ready to accept the ride request 406. In some embodiments, assignment of the ride request 406 to a particular autonomous vehicle 204 may be based on the proximity of the autonomous vehicle 204 to the user, and the current interior temperatures 500 of the available autonomous vehicles 204 in the area. An autonomous vehicle 204 associated with a lowest energy cost (in terms of both distance to the user and energy costs associated with adjusting the interior temperature 500 to the set temperature 410), which is also within an acceptable pick up time, may be assigned to the ride request 406.

Since efficiencies of climate control systems vary between autonomous vehicles 204, autonomous vehicles 204 may transmit their accessory load history to the cloud server 208 to enable embodiments of the invention to make that determination. For example, in one embodiment, an autonomous vehicle 204 with a greater deviation range 508 but a higher-efficiency heating, ventilation, and air-conditioning ("HVAC") system may consume less energy than an inefficient autonomous vehicle 204 closer to the user. In rare cases where not autonomous vehicle 204 is within an appropriate deviation range 508 of the set temperature 410, the autonomous vehicle 204 may delay pickup of the user until the set temperature 410 is attained.

Live data may also be considered in establishing the probability of receiving a ride request 406. Such data may include, for example, a present unanticipated demand for rides, or irregular events. If there is a present high demand scenario which does not fall under a known event or historical expectation, the probability of a ride request 406 may be increased, and the deviation range 508 for the autonomous vehicle 204 may be decreased.

Figure 6:
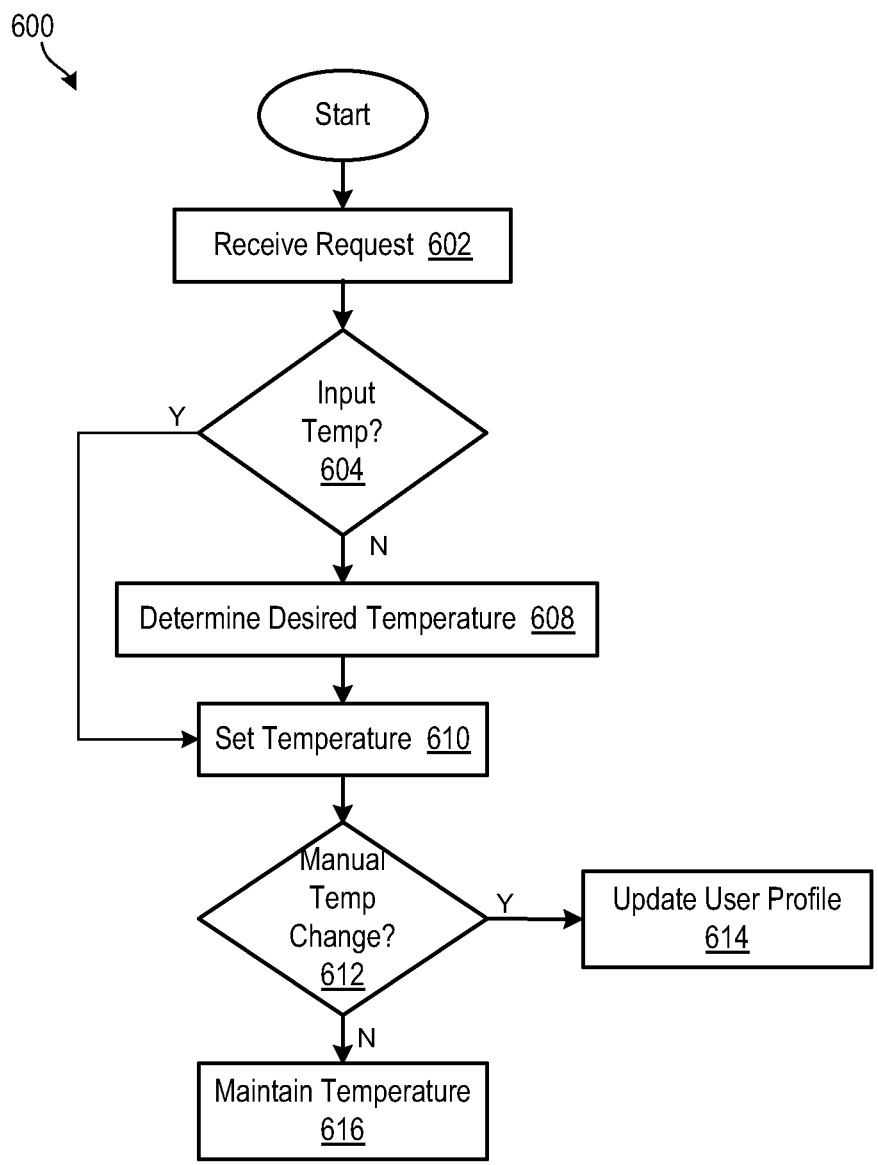
FIG. 6 is a flow chart showing a process for establishing a set temperature of an autonomous vehicle in accordance with certain embodiments of the invention.

Referring now to FIG. 6, a method 600 for establishing a set temperature for an autonomous vehicle in accordance with embodiments of the present invention is shown. First, an autonomous vehicle may receive a request 602 for a ride from a user. In some embodiments, the user may input 604 a desired temperature in connection with the ride request. If the user chooses to input 604 a desired temperature, the input temperature may be established 610 as the set temperature. If not, a desired or set temperature may be determined 608 based on various historical, live, and user-specific factors. As discussed above, these factors may include, for example, pickup location, outside temperature, weather conditions, geographic location, date, historical customer preferences, historical customer attributes, events or special circumstances at the pickup location, and the like. A learning algorithm may take such factors and their associated weights into account to determine 608 a set temperature for maximum user comfort. In certain embodiments, calculations associated with the learning algorithm may be performed in the cloud, or onboard the autonomous vehicle.

In some embodiments, the method 600 may enable a user to manually change 612 the interior temperature of the autonomous vehicle during a ride. If there is a manual change 612, the set temperature may be adjusted accordingly and a user profile associated with the user may be updated 614 to reflect the change. If the user does not make a manual change 612, the set temperature may be maintained 616.

Figure 7:
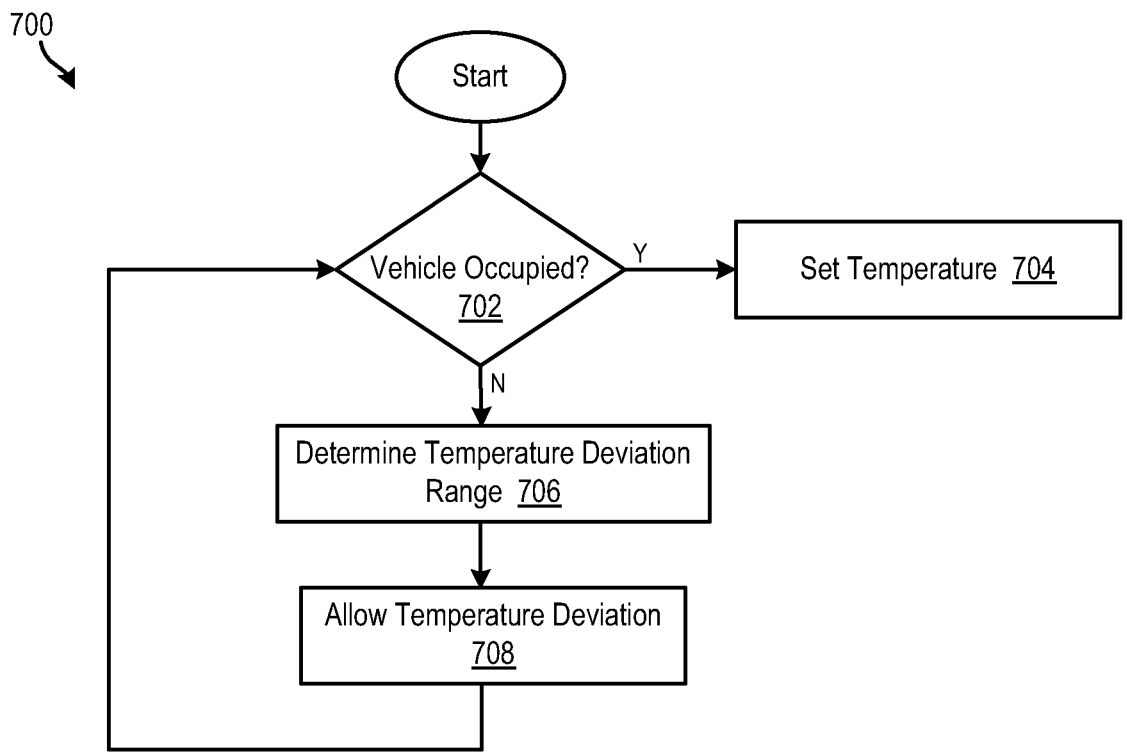
FIG. 7 is a flow chart showing a process for allowing temperature deviation in accordance with the invention.

Referring now to FIG. 7, a method 700 for allowing an interior temperature of an autonomous vehicle to deviate in accordance with embodiments of the invention may include determining whether the autonomous vehicle is occupied 702. If yes, an actual or predicted desired temperature may be set 704, as described in detail above. If no, an appropriate temperature deviation range may be determined 706.

The temperature deviation range may be determined 706 based on parameters including, for example, historical likelihood of the autonomous vehicle receiving a ride request, average distance to an expected pickup location, distance of the autonomous vehicle from other available autonomous vehicles, readiness of other autonomous vehicles in the vicinity, and primary purpose assigned to the autonomous vehicle. An energy cost associated with performing a heating or cooling operation may also be determined with respect to each step or degree away from the set temperature.

Each or any of these factors may be included in an optimization algorithm to calculate a minimum temperature, a maximum temperature, and a temperature deviation range therebetween. Beneficially, the temperature deviation range may be calculated to balance a probability of receiving a ride request against a calculated energy cost to appropriately condition the autonomous vehicle. In this manner, the optimization algorithm may maintain a high level of comfort while minimizing fuel consumption costs.

In some embodiments, the optimization algorithm may be scalable for a single autonomous vehicle as well as large fleets of autonomous vehicles. In certain embodiments, fleets originally designated for different purposes (such as passenger travel and parcel delivery) may be selectively combined to provide greater ride-sharing capacity, while maximizing customer satisfaction and minimizing fuel consumption.

A total risk function calculation may be used to predict an ideal temperature deviation range based on energy costs associated with conditioning the vehicle and the vehicle's expected risk of receiving a ride request. Defining maximum and minimum temperatures for the autonomous vehicle in this manner may minimize fuel consumption while also minimizing a risk of reaching a pickup location at an undesired temperature.

In some embodiments, the energy cost calculation may also take into account the possibility of using natural convection to adjust the inside temperature of the autonomous vehicle. For example, in some embodiments it may be advantageous to open the vehicle windows instead of operating the HVAC system. If conditions are safe and an average speed of the autonomous vehicle is favorable for aerodynamics, the windows of the vehicle may remain open while the vehicle is unoccupied. In such embodiments, energy costs of operating the HVAC system may be balanced with energy costs of natural convection in establishing the temperature deviation range.

In one embodiment of a fleet operation, the temperature deviation range may be determined 706 by first analyzing the likelihood of the autonomous vehicle receiving a ride request. The condition of other vehicles in the vicinity may then be evaluated based on their associated energy costs and efficiencies relative to the autonomous vehicle. This comparison may be used to determine whether it would be more energy efficient for one of the other more well-conditioned vehicles to accept the ride request. In certain embodiments, the interior volume of autonomous vehicles may be provided such that the cost per degree of conditioning may be factored into the optimization algorithm.

Upon determining 706 the appropriate temperature deviation range, the temperature of the autonomous vehicle may be allowed 708 to deviate from the set temperature within the temperature deviation range.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
receiving, by one or more processors and from a user, a ride request for an autonomous vehicle;
determining, by the one or more processors and based on the ride request, a desired temperature for the autonomous vehicle;
automatically adjusting, by the one or more processors, a current temperature of the autonomous vehicle to substantially match the desired temperature upon the autonomous vehicle reaching the user;
determining, by the one or more processors, that the autonomous vehicle is unoccupied and not presently responding to an accepted ride request;
iteratively calculating, by the one or more processors and based on the vehicle being unoccupied and not presently responding to an accepted ride request, a temperature deviation range representing a range the current temperature is allowed to deviate from the desired temperature by, in part, at least one of calculating a probability that another ride will be requested, ascertaining a proximity of other available vehicles, and comparing a current interior temperature of the autonomous vehicle to current interior temperatures of the other available vehicles;
iteratively determining, by the one or more processors, the current interior temperature of the autonomous vehicle; and
automatically controlling, by the one or more processors and based on the vehicle being unoccupied and not presently responding to an accepted ride request, the current interior temperature of the autonomous vehicle such that the current temperature remains within the calculated temperature deviation range.

2. The method of claim 1, wherein determining the desired temperature comprises receiving user input indicating the desired temperature.

3. The method of claim 1, wherein determining the desired temperature further comprises analyzing at least one parameter selected from the group consisting of a pickup location, an event at the pickup location, an outside temperature, weather conditions, a geographic location, a date, historical preferences of the user, and historical attributes of the user.

4. The method of claim 1, wherein determining the desired temperature comprises referencing a zone of human comfort on a standard psychrometric chart.

5. The method of claim 1, wherein iteratively calculating the temperature deviation range further comprises predicting an expected travel time for pickup.

6. The method of claim 1, wherein iteratively calculating the temperature deviation range further comprises calculating an energy cost associated with adjusting the current interior temperature of the autonomous vehicle to the desired temperature.

7. The method of claim 1, wherein the probability calculation is based on at least one parameter selected from the group consisting of a time of day, a day of week, a date, a distance from pickup points of interest, weather conditions, an outside temperature, a parking availability, a geographic location, and regularly-occurring events.

8. The method of claim 3, wherein each of the at least one parameter is weighted.

9. The method of claim 1, wherein the ride request comprises a user profile associated with the user.

10. The method of claim 9, further comprising updating the user profile to reflect manual adjustments to the desired temperature made by the user upon entering the autonomous vehicle.

11. A system for optimizing climate control in an autonomous vehicle, comprising:
at least one processor;
and at least one memory device operably coupled to the at least one processor and storing instructions for execution on the at least one processor, the instructions causing the at least one processor to:
receive, from a user, a ride request for an autonomous vehicle;
determine, based on the ride request, a desired temperature for the autonomous vehicle;
automatically adjust a current temperature of the autonomous vehicle to substantially match the desired temperature upon the autonomous vehicle reaching the user;
determine that the autonomous vehicle is unoccupied and not presently responding to an accepted ride request;
iteratively calculate, based on the vehicle being unoccupied and not presently responding to an accepted ride request, a temperature deviation range representing a range the current temperature is allowed to deviate from the desired temperature by, in part, at least one of calculating a probability that another ride will be requested, ascertaining a proximity of other available vehicles, and comparing a current interior temperature of the autonomous vehicle to current interior temperatures of the other available vehicles;
iteratively determine the current interior temperature of the autonomous vehicle; and
automatically control, based on the vehicle being unoccupied and not presently responding to an accepted ride request, the current interior temperature of the autonomous vehicle such that the current temperature remains within the calculated temperature deviation range.

12. The system of claim 11, wherein determining the desired temperature comprises receiving user input indicating the desired temperature.

13. The system of claim 11, wherein determining the desired temperature further comprises analyzing at least one parameter selected from the group consisting of a pickup location, an event at the pickup location, an outside temperature, weather conditions, a geographic location, a date, historical preferences of the user, and historical attributes of the user.

14. The system of claim 11, wherein determining the desired temperature further comprises referencing a zone of human comfort on a standard psychrometric chart.

15. The system of claim 11, wherein iteratively calculating the temperature deviation range further comprises predicting an expected travel time for pickup.

16. The system of claim 11, wherein iteratively calculating the temperature deviation range further comprises calculating an energy cost associated with adjusting the current temperature of the interior of the autonomous vehicle to the desired temperature.

17. The system of claim 11, wherein the probability calculation is based on at least one parameter selected from the group consisting of a time of day, a day of week, a date, a distance from pickup points of interest, weather conditions, an outside temperature, a parking availability, a geographic location, and regularly-occurring events.

18. The system of claim 11, wherein the ride request comprises a user profile associated with the user.

19. The system of claim 18, further comprising updating the user profile to reflect manual adjustments to the desired temperature made by the user upon entering the autonomous vehicle.

20. A non-transient computer program product for optimizing climate control in an autonomous vehicle, the computer program product comprising a computer-readable storage medium having computer-usable program code embodied therein, the computer-usable program code configured to perform the following when executed by at least one processor:
    receive, from a user, a ride request for an autonomous vehicle;
    determine, based on the ride request, a desired temperature for the autonomous vehicle;
    automatically adjust a current temperature of the autonomous vehicle to substantially match the desired temperature upon the autonomous vehicle reaching the user;
    determine that the autonomous vehicle is unoccupied and not presently responding to an accepted ride request;
    iteratively calculate, based on the vehicle being unoccupied and not presently responding to an accepted ride request, a temperature deviation range representing a range the current temperature is allowed to deviate from the desired temperature by, in part, at least one of calculating a probability that another ride will be requested, ascertaining a proximity of other available vehicles, and comparing a current interior temperature of the autonomous vehicle to current interior temperatures of the other available vehicles;
    iteratively determine the current interior temperature of the autonomous vehicle; and
    automatically control, based on the vehicle being unoccupied and not presently responding to an accepted ride request, the current interior temperature of the autonomous vehicle such that the current temperature remains within the calculated temperature deviation range.

\* \* \* \* \*